United States Patent [19]
McWhinnie et al.

[11] 3,956,770
[45] May 11, 1976

[54] CONTACT START-STOP SELF-ELEVATING AIR SUPPORTED MAGNETIC RECORDING HEAD

[75] Inventors: George G. McWhinnie, Lederach; Joseph P. Pomian, King of Prussia, both of Pa.

[73] Assignee: Sperry Rand Corporation, New York, N.Y.

[22] Filed: Aug. 26, 1974

[21] Appl. No.: 500,241

[52] U.S. Cl. .............................. 360/103; 360/130
[51] Int. Cl.² .......................................... G11B 5/60
[58] Field of Search ........... 360/103, 102, 109, 130; 308/9

[56] References Cited
UNITED STATES PATENTS

| | | | |
|---|---|---|---|
| 2,913,536 | 11/1959 | Fuller et al. ......................... | 360/103 |
| 3,177,495 | 4/1965 | Felts .................................... | 360/103 |
| 3,193,810 | 7/1965 | Sampson............................. | 360/103 |
| 3,754,104 | 8/1973 | Piper et al. .......................... | 360/103 |
| 3,774,183 | 11/1973 | Roscamp ............................. | 360/103 |
| 3,812,535 | 5/1974 | Higgins et al. ...................... | 360/103 |

*Primary Examiner*—Alfred H. Eddleman
*Attorney, Agent, or Firm*—William E. Cleaven

[57] ABSTRACT

The present device is a flying head type element comprising a light weight housing means formed to provide sled or runner means protruding from its underside. Each sled or runner means has a magnetic read, write or erase head (or any combination thereof) located therein. Since the land area, or flying face, against which the layer of air (being dragged by the recording medium) pushes is relatively small, i.e., the area of the runner, the value of the loading force necessary to keep the head in close proximity to the recording surface is relatively small. In addition, the loading device is also the support means for the housing and is formed to keep the housing means from being spuriously moved axially or radially in response to a run-out of the disc surface. The housing area is so light and loaded so lightly that if the cushion of air fails for any reason and the housing means comes in contact with the disc surface, there will be no damage inflicted to the disc surface.

5 Claims, 3 Drawing Figures

U.S. Patent   May 11, 1976   3,956,770
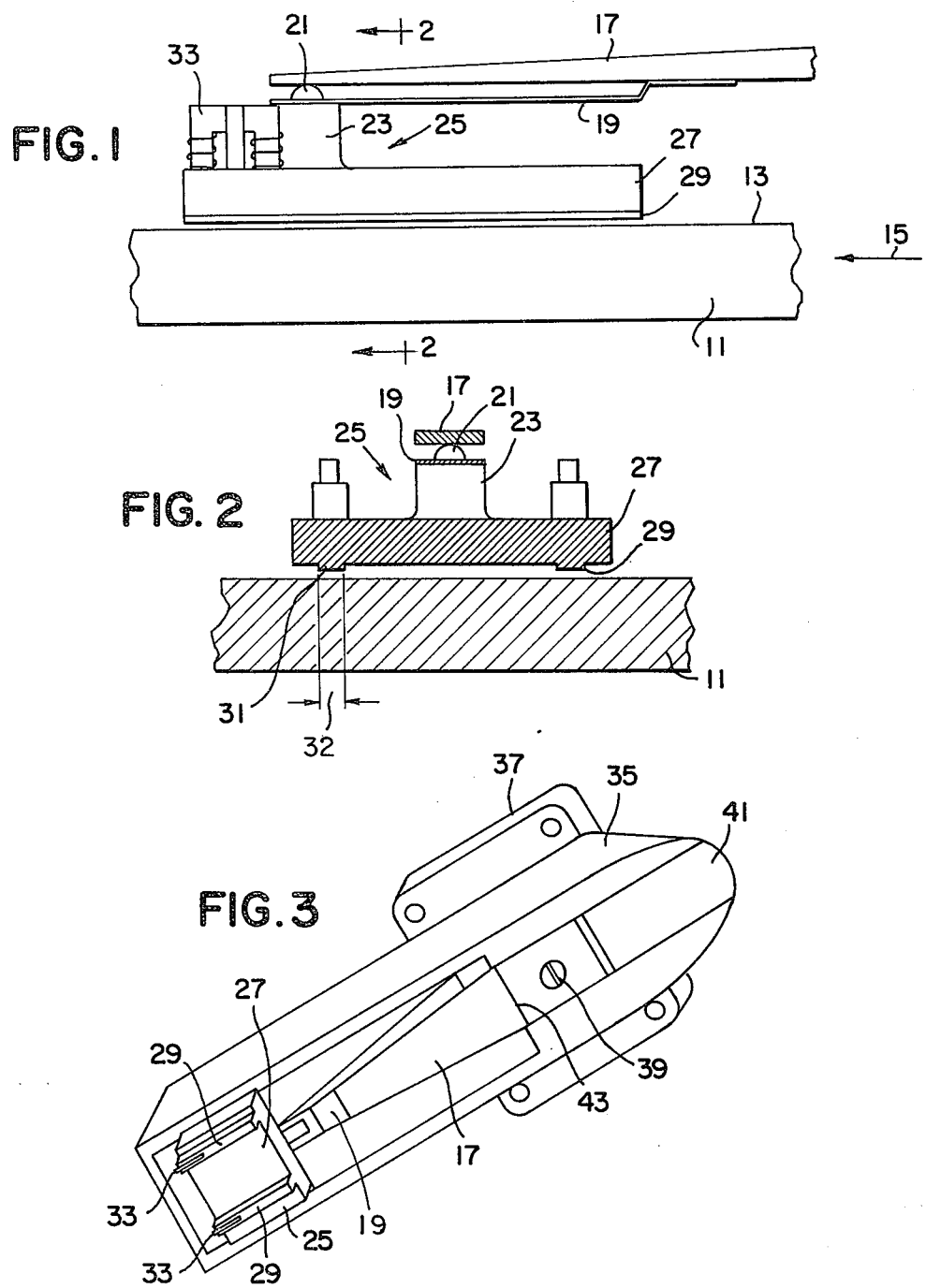

CONTACT START-STOP SELF-ELEVATING AIR SUPPORTED MAGNETIC RECORDING HEAD

BACKGROUND

Flying magnetic recording heads are well-known in the art. Certain problems are involved with such heads, the foremost of which reside in designing the head to fly in very close proximity to the surface of the recording medium. It is well understood that the closer the head flies, or the shorter the distance of its elevation from the recording surface, the higher will be the flux reversal density. However, since such heads fly so close to the surface, any eccentricities, or irregularities, in the surface could cause an impact or a crash between the head and the recording surface. With prior art such a crash very often, and probably as a general rule, causes scoring or damage to the recording medium. Accordingly, such heads have been designed to fly over irregularities, i.e., be lifted with the irregularities. Such flying heads are lifted by the layer of air that is dragged along with a moving recording medium. Accordingly, it has become the practice to design a flying magnetic recording head which can be lowered onto a moving stream of air and which will have a relatively low flying height.

One of the interesting aspects of this development is that the flying head has to be loaded or forced downward toward the surface of the recording medium in order to acquire a suitable or acceptable flying height. It follows however that if the air support for some reason is terminated (e.g. due to dirt or foreign matter or some other reason) the head will impact the recording medium with relatively great force because of the loading described above. This impact in the prior art has been found to heavily damage the recording medium. Such occasions make the prior art arrangement undesirable.

In addition, the mechanism for lowering the head as well as the mechanism for loading the head can be costly. The present device eliminates the necessity of lowering a flying head onto a moving layer of air; eliminates the fear of heavily damaging the recording medium; permits the elevation of the flying head to be effected from a contact take-off; permits the flying head to come in contact upon the termination of its flight; and provides an extremely low flying height.

SUMMARY

The present flying head arrangement includes a major support arm which determines the flying height. Connected to the support arm is a bias support means which permits the flying head housing to lift or be pushed upward until it meets the major support arm and which stabilizes the housing as related to a twisting effect. In addition the housing is formed to resemble a catamaran. The runners of the catamaran head act together as the flying face and since there is relatively little pressure developed against this limited flying face the integrated force upward is relatively small. It follows that the housing need be only lightly loaded to effect a desirable flying height. In addition the runners each have a slight curvature which in conjunction with the said light loading enables the flying head to start from a contact position on the recording medium and be lifted to the proper elevation during the flying period. At the same time, the flying head housing is able to come to rest on the surface of the recording medium when the medium is stopped and there is no damage done to the recording medium.

The features and objects of the present invention will be better understood in accordance with the description hereinafter taken in conjunction with the drawings, wherein:

FIG. 1 is a side view of the present invention;

FIG. 2 is a view of the present invention shown in FIG. 1 taken along the lines 2—2;

FIG. 3 is a pictorial of the present invention as it is viewed from the underside.

Consider FIG. 1 wherein there is shown a recording medium 11 which has a recording surface 13. The recording medium 11 is traveling in the direction shown by the arrow 15. Mounted above the recording medium 11 is a preloaded flexure element 17. It will be noted that the preloaded flexure element 17 has a bias spring 19 secured thereto. The bias spring 19 extends to the left and has a slot therein which fits over the spherical load bearing 21.

The spherical load bearing 21 is strategically mounted in the magnetic head housing 25. The magnetic head housing 25 is formed with a relatively large flat bed 27 from which there protrudes two runners, one runner 29 which can be seen in FIG. 1 and the other runner 31 which can be seen in FIG. 2.

The flying head housing 25 as depicted in FIG. 1 is in the flying mode. In other words there is a layer of air being dragged with the recording surface 13 and it is passing under the runners 29 and 31 to cause those runners to lift or be pushed upward. The upward travel of the flying head housing 25 is limited by the distance that the spherical load bearing 21 travels before it comes in contact with the preloaded flexure arm. Actually if there were some irregularities in the recording medium 11 so that the surface 13 had any kind of an up and down motion the air being dragged along therewith would cause the flying head housing to be lifted over the irregularity and would force the spherical load bearing against the preloaded flexure arm causing it to lift.

While it may be difficult to discern, the lower surface of the runner 29, shown in FIG. 1, has a slight curvature thereto. The slight curvature causes the right hand end of the runner to be lifted upward toward the oncoming layer of air that is being dragged by the surface 13. Accordingly when the flying head housing is at rest, on the recording surface, and the recording medium 11 is moved toward the left, this layer of air that is clinging to the surface 19 will "get under" the edge of the runner 29 (as well as under the edge of the runner 31) and provide a lift to the flying head housing. It becomes apparent then that this particular flying head housing is self-elevating from a contact position.

It is well understood that the integrated force upward, provided by a flying head, is directly proportional to the amount of land area or the size of the flying face which is coming in contact with the laminer layer of air that is being carried along on the surface of the recording medium. Accordingly if there is a large land area the integrated force upward is substantial. For instance, if the present flying head did not have the runners protruding from the base 27 and that base were 0.29 inches by 0.33 inches, which approximates the size of the housing in the preferred embodiment, then such a flat surface would require a loading factor or a force downward of 350 grams. The significant difference between the flying head housing without the runners and with the runners is brought into sharp focus when it is understood that the configuration shown in FIGS. 1 and 2 is loaded at 6½ to 12 grams. With 6½ to 12 gram loading, the present flying head can fly as low as 50 microinches off the surface of the disc. The read/write and erase head has a width of 6 to 10 mils in the preferred embodiment and therefore the width of the split face, which is of course the flying face and is depicted in FIG. 2 as the section 32, is approximately 12 mils. In the present state of the art the magnetic read-write and erase head can be as narrow as 4 mils and therefore can be housed in a split structure of approximately 8 mils which would make the loading even less than the 6½ to 12 grams previously mentioned.

Returning to FIG. 1 it will be noted that the read/write and erase head assembly 33 is mounted at the trailing edge of the housing. Each read/write and erase head assembly has a first magnetic head which is used for erasing and a second magnetic head which is used for both reading and writing. The erase head precedes the read/write head and hence as the recording medium 11 passes underneath the recording head, it is first erased and then information is written thereon, if in fact there is a write operation in effect. However, if there is a read operation in effect the erase head is not energized.

Consider FIG. 3 which shows an under view of the entire housing with the cover plate removed. In FIG. 3 there is shown an assembly base device 35 which has a flanged portion 37 protruding therefrom. The flange 37 has four holes therein through which screws may be passed to be secured to the assembly of the machine. In FIG. 3 the preloaded flexure 17 is shown being secured to the assembly base element 35 by virtue of the screw 39. There is a keyway 41 cut into the assembly base element 35 in order that the preloaded flexure arm 17 may be properly located. Also as can be seen in FIG. 3, the bias spring 19 is secured to the flexure arm 17 and it will be noted in the view of the assembly, as shown in FIG. 3, that the bias spring 19 is slotted which enables the spring to act efficiently in restoring the housing 25 when the housing may be involved in a twisting movement. The read/write and erase heads 33 can be seen from the underside in FIG. 3 as they are mounted into the runners 29 and 33.

The preloaded flexure arm 17 is made of a hardened beryllium copper and is set and bent at the location 43 to provide the load or pushing down factor on the spherical load bearing. It should be understood that the heads in the catamaran flying head can be located to accommodate two different tracks of information or can be arranged to accommodate more than two tracks by adding more than two runners. It should also be understood that a single runner head if such were to be advantageous would still have the advantages of self-elevation from a contact start and a contact stop without damage to the recording medium. It should further be noted that the distance between the bottom edge of the runner and the bottom edge of the bed 27 is sufficiently deep that there is no effect on the bed 27 by the laminar flow of air thereunder.

What is claimed is:

1. A flying head device for locating magnetic transducer means in close proximity to a movable magnetic recording medium when it is moving comprising in conbination: a housing means having upper and lower bases and formed to have a pair of runner-like protrusions extending from said lower base; said housing having a width of x inches and a length of y inches whereby said lower base is xy square inches; each of said protrusions formed to have a very narrow width and a length which is approximately equal to y whereby the area of the lower surface of each protrusion is in the range of .014 to .034 of said xy square inches; said protrusions each further formed to have a leading section and a trailing section with said leading section formed to have a slight curvature upward to enable air to wedge thereunder in the event air is moved toward said leading section; bearing means mounted on said upper base of said housing means; a pair of magnetic transducer means with one each mounted in a different one of said trailing sections of said protrusions; flexure means mounted to a fixed means and disposed to locate said housing means over said movable magnetic recording medium; and bias spring means secured to said flexure means and formed to fit over said bearing means to thereby locate said housing means over said movable magnetic recording medium whereby when said movable magnetic recording medium is moved under said protrusions said housing means will be lifted until said bearing means abuts said flexure means.

2. A flying head device according to claim 1 wherein said magnetic transducers are each a magnetic read, write or erase head.

3. A flying head device according to claim 1 wherein said housing means is formed in a catamaran type device wherein said protrusions are analogous to the runner like elements of said catamaran type device.

4. A flying head device according to claim 1 wherein said bearing means is a spherical load bearing.

5. A flying head device according to claim 1 wherein said width x is 0.29 inches and said width y is 0.33 inches and wherein each of said protrusions is 0.33 inches long and in the range of 0.4 mils to 0.10 mils wide.

* * * * *